July 24, 1934.  W. B. DREVITSON  1,967,229

FISH FEEDING AND POSITIONING MECHANISM

Filed Dec. 2, 1931

INVENTOR.
Wesley. B. Drevitson
BY Philip A. Minnis
ATTORNEY

Patented July 24, 1934

1,967,229

UNITED STATES PATENT OFFICE 1,967,229

FISH FEEDING AND POSITIONING MECHANISM

Wesley B. Drevitson, Millbrae, Calif., assignor to Food Machinery Corporation, San Jose, Calif., a corporation of Delaware Application December 2, 1931, Serial No. 578,537

14 Claims. (Cl. 17—2)

This invention relates to a mechanism for feeding and positioning fish or other articles of a like nature, and comprehends the provision of an apparatus suitable for use in fish canneries or packing plants for receiving large masses of fish in disarranged positions and rapidly rearranging them for discharge in uniform positions as, for example, head foremost.

Preliminary to packing fish into cans or other containers they are ordinarily passed through an eviscerating machine designed to remove the heads, tails and entrails, which are inedible, and the successful operation of such machines demands that the fish be fed thereto in such manner that their heads all lie in the same direction.

The placing of fish in such machines by hand is a laborious process, necessarily too slow and expensive to permit of quantity production, and while machines have been designed for the purpose they have also heretofore been slow and unsuited for the rapid handling of fish in large numbers.

It is the principal object of this invention to provide a fish feeding and positioning mechanism adapted to receive quantities of fish without regard to position, to rearrange them so that their heads all lie in the same direction, and to deliver them in such position to a suitable point of delivery such as an eviscerating machine.

It is also one of the chief objects of the invention to provide a machine for the purpose stated which shall be of large capacity, and reliable in operation.

Other objects and advantages will become apparent as the description proceeds in connection with the accompanying drawing, in which.

Figure 1:
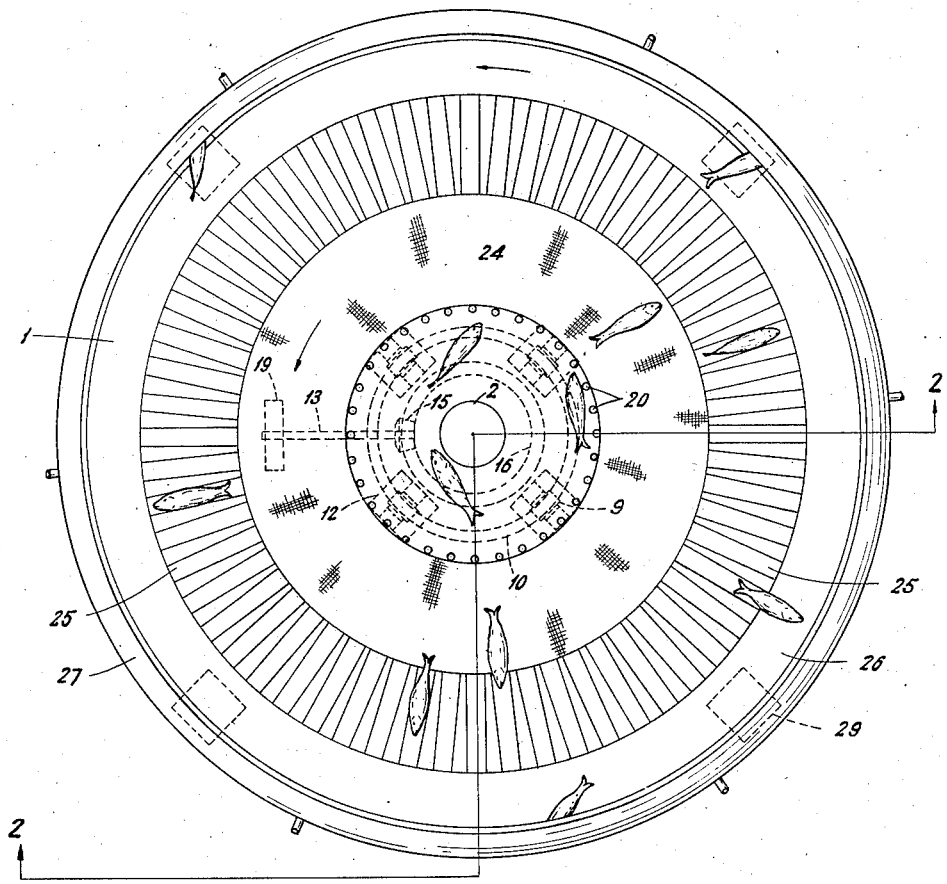
Figure 1 is a plan view of a preferred form of apparatus embodying the invention.
Figure 2:
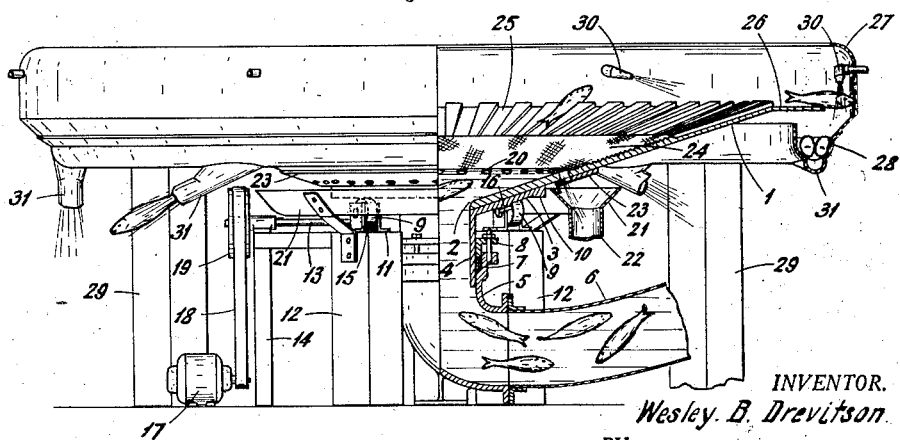
Figure 2 is a side elevation partly in section as reviewed along the line 2—2 of Figure 1.

Referring to the drawing, the apparatus illustrated comprises an inverted cone-shaped table 1, having its apex cut away to form an orifice 2, and supported by a funnel-shaped base 3 provided with a downwardly extending cylindrical pipe 4 forming an inlet passage in registry with the orifice 2. The pipe 4 is rotatably journaled in telescopic fashion within the upwardly extending portion of an elbow pipe 5 connected to a delivery conduit 6, and a liquid tight joint is provided by the packing 7 held in place by the packing sleeve 8. The base 3 and associated table 1 are rotatably supported by a series of idler rollers 9 arranged in a circle therebeneath so as to engage with an annular track 10 provided on the undersurface of the base. The rollers 9 are journaled in brackets 11 secured to the tops of suitable pedestals 12.

For imparting rotation to the table there is provided a horizontal shaft 13 supported by a framework 14 and provided at one end with a bevel gear 15 in mesh with a ring gear 16 secured to the underside of the base 3. The shaft 13 is driven so as to rotate the table 1 in the direction indicated by the arrow by a prime mover 17 connected to the shaft by an endless belt 18 passing over a pulley 19 secured to the outer end of the shaft.

The fish are delivered to the apparatus by means of a stream of water flowing through the delivery pipe 6 and upwardly through the elbow 5 and onto the conical table 1, where the water, or the major portion of it, is discharged through a series of discharge orifices 20 into an annular trough 21 which directs it to a drain pipe 22. The amount of water discharged through the orifices 20 may be regulated by a ring shaped valve 23 provided with holes for registry with said orifices and slidable with respect to the table so as to bring the valve holes more or less into registry with the table orifices as desired. The manner in which the fish and water are delivered to the pipe 6 is not shown, as this may be accomplished in any suitable way, as by means of a connecting hopper placed at an elevation higher than the discharge openings 20 and into which the water and fish are placed.

As the table is rotated both water and fish are thrown outwardly by centrifugal force, the major portion of the water escaping through the orifices 20 and the fish being cast upon the table, where they continue to pass outwardly toward the rim of the table by reason of the centrifugal force.

The fish may be cast upon the table in various positions and in order to turn them around so their heads are all directed outwardly, the table is provided with a strip of roughened surface 24 extending outwardly from the discharge orifices 20, such as wire mesh screen or the like, which offers only a small amount of frictional resistance to a fish passing head first thereover, but which engages with the scales of a fish to prevent it from passing over it tail first. The natural tendency for the fish to be turned around with their heads outwardly by reason of their heads being heavier than their tails, together with the retarding action of the roughened surface 24 and the jostling by other fish passing over the table, causes any fish deposited on the table tail first to be turned around so that all approach the upper edge of the table head foremost.

The remainder of that portion of the inclined table surface on the outer side of the roughened surface 24 is provided with a series of radially extending grooves 25 into which the fish pass as they leave the roughened surface. These grooves further assist in positioning the fish heads foremost and positively guide them in such position as they pass upwardly and outwardly of the table to a horizontal flange 26 across which they pass to be discharged over its outer edge.

A stationary annular deflecting wall 27 is disposed adjacent the outer periphery of the table flange 26 and is extended downwardly beneath the flange to form a circular trough 28, supported by pillars 29, to receive the fish as they are discharged from the table. It will be seen that as the fish pass head foremost across the flange 26 their heads frictionally engage with the wall 27, which causes them to be turned tangentially to the table so as to fall into the trough 28 with their heads uniformly directed. The width of the flange 26 plus the width of the space between the annular wall 27 is preferably about the same as the length of the average sized fish with which the apparatus is to be used, so that the fish may be readily turned without interference from the grooves 25.

The fish are caused to pass along the trough 28 by streams of water directed tangentially and slightly downwardly into the trough by a series of nozzles 30. The water issuing from the nozzles also assists in turning the fish tangentially to the flange 26 so as to fall into the trough. Any number of nozzles may be provided as required and additional water may be supplied to the trough if desired by positioning the valve 23 so as to permit a portion of the water from the feed pipe 6 to be thrown outwardly over the surface of the table 1 along with the fish, thus also lubricating the table and assisting the passage of the fish thereover.

At suitably spaced intervals chutes 31 branch off from the trough 28, which direct the fish and water to any suitable point of delivery.

Although the apparatus herein described is particularly suited for use with fish, it will be understood that the same may be used with little or no modification to feed and position other articles as well, as for example certain vegetables such as unhusked ear corn and the like which must be delivered to husking machines with their butt ends lying in the same direction. The invention is, consequently, not limited to the specific use herein described but may embrace such other uses and modifications as fall within the spirit of the invention.

Having now described my invention and in what manner the same may be used, what I claim as new and desire to protect by Letters Patent is:

1. An apparatus of the character described comprising a revoluble table, means for delivering fish upon the table, a stationary deflecting wall extending around the edge of the table and spaced therefrom for frictionally engaging the heads of fish thrown from the table by centrifugal force so as to turn them tangentially thereto, the spacing between said deflecting wall and the table providing an opening of sufficient width to allow the tangentially turned fish to drop therethrough, and a trough extending beneath said opening for receiving the fish as they drop from the table through said opening.

2. An apparatus of the character described comprising a revoluble table, means for delivering fish upon the table, a stationary deflecting wall extending around the edge of the table and spaced therefrom for frictionally engaging the heads of fish thrown from the table by centrifugal force so as to turn them tangentially thereto, a plurality of nozzles adjacent said wall for directing streams of liquid substantially tangentially to the table periphery to assist in turning the fish, and a trough beneath the periphery of the table for receiving the fish.

3. An apparatus for positioning fish and the like, comprising a revoluble table of inverted cone-like shape having an orifice through its apex, and means for delivering a stream of liquid and fish upwardly through said orifice to deposit the fish upon the table for delivery therefrom by centrifugal force.

4. An apparatus for positioning fish and the like comprising a revoluble table of inverted cone-like shape having an orifice centrally therethrough, a delivery conduit in registry with said orifice, and means for deliverying a stream of liquid and fish through said conduit to deposit the fish upon the table for delivery therefrom by centrifugal force.

5. An apparatus for positioning fish and the like comprising a revoluble table of inverted cone-like shape having an orifice centrally therethrough, and means for delivering a stream of liquid and fish upwardly through said orifice to deposit the fish upon the table for delivery therefrom by centrifugal force, said table being provided with a roughened surface surrounding said orifice to frictionally retard those fish passing tail first over the table and cause them to be turned about and delivered head foremost.

6. An apparatus for positioning fish and the like comprising a revoluble table having a roughened area surrounding its center for frictionally retarding fish passing tail foremost thereover under the influence of centrifugal force and causing them to be turned about and delivered head foremost, a plurality of fish conducting grooves extending radially from the outer edge of such roughened area toward the periphery of the table, and means for delivering fish centrally of the table.

7. An apparatus for positioning fish and the like comprising a revoluble table of inverted cone-like shape having a roughened area surrounding its center for frictionally retarding fish passing tail foremost thereover under the influence of centrifugal force and causing them to be turned about and delivered head foremost, a plurality of fish conducting grooves extending radially from the outer edge of such roughened area toward the periphery of the table, and means for depositing fish upon the table near its center.

8. An apparatus for positioning fish and the like, comprising a revoluble table having an orifice centrally therethrough and a roughened area surrounding said orifice for frictionally retarding fish passing tail first over the table under the influence of centrifugal force and causing them to be turned about and delivered head foremost, and means for delivering a stream of liquid and fish upwardly through said orifice to deposit the fish upon the roughened area, said table surface being provided with a plurality of fish conducting grooves extending radially from the outer edge of said roughened area toward the periphery of the table.

9. An apparatus for positioning fish and the like comprising a revoluble table of inverted cone-like shape, and means for delivering fish in a stream of liquid centrally of the table, said table being provided with liquid discharge openings therethrough between its periphery and the point of delivery of said liquid and fish whereby to limit the level of liquid in the table.

10. An apparatus for positioning fish and the like comprising a revoluble table of inverted cone-like shape having an orifice centrally therethrough, and means for delivering a stream of liquid and fish upwardly through the orifice to deposit the fish upon the table, said table being provided with liquid discharge openings therethrough between its periphery and said orifice for limiting the depth of liquid in the table.

11. An apparatus for positioning fish and the like comprising a revoluble table of inverted cone-like shape, and means for delivering fish in a stream of liquid centrally of the table, said table being provided with a plurality of liquid discharge openings therethrough outwardly of the point of delivery of said liquid and fish whereby to limit the level of liquid in the table, and having a roughened area surrounding its center and outwardly of said discharge openings for frictionally retarding fish passing tail foremost thereover under the influence of centrifugal force and causing them to be turned about and delivered head foremost.

12. An apparatus for positioning fish and the like comprising a revoluble table of inverted cone-like shape having an orifice centrally therethrough, and means for delivering a stream of liquid and fish upwardly through the orifice to deposit the fish upon the table, said table being provided with a plurality of liquid discharge openings therethrough outwardly of said orifice to limit the depth of liquid in the table, and having a roughened area surrounding said orifice outwardly of the discharge openings for frictionally retarding fish passing tail foremost thereover under the influence of centrifugal force and causing them to be turned about and delivered head foremost.

13. An apparatus for positioning fish and the like, comprising a revoluble table of inverted cone-like shape and means for delivering fish in a stream of liquid centrally of the table, said table being provided with a plurality of liquid discharge openings therethrough outwardly of the point of delivery of said liquid and fish whereby to limit the level of liquid in the table, a roughened area surrounding its center outwardly of said discharge openings for frictionally retarding fish passing tail foremost thereover under the influence of centrifugal force and causing them to be turned about and delivered head foremost, and a plurality of fish conducting grooves extending radially from the outer edge of said roughened area toward the periphery of the table.

14. An apparatus for positioning fish and the like comprising a revoluble table of inverted cone-like shape and having an orifice centrally therethrough, and means for delivering a stream of liquid and fish upwardly through the orifice to deposit the fish upon the table, said table being provided with a plurality of liquid discharge openings therethrough outwardly of said orifice whereby to limit the level of liquid in the table, a roughened area surrounding said orifice outwardly of said discharge openings for frictionally engaging fish passing tail foremost thereover under the influence of centrifugal force and causing them to be turned about and delivered head foremost, and a plurality of fish conducting grooves extending radially from the outer edge of said roughened area toward the periphery of the table.

WESLEY B. DREVITSON.